(12) United States Patent
Chung et al.

(10) Patent No.: US 11,860,029 B2
(45) Date of Patent: Jan. 2, 2024

(54) LIGHT INTENSITY DETECTION CIRCUIT, LIGHT INTENSITY DETECTION METHOD AND LIGHT INTENSITY DETECTION APPARATUS

(71) Applicants: Beijing BOE Sensor Technology Co., Ltd., Beijing (CN); BOE Technology Group Co., Ltd., Beijing (CN)

(72) Inventors: Kunjing Chung, Beijing (CN); Dexi Kong, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 358 days.

(21) Appl. No.: 17/418,260

(22) PCT Filed: Dec. 29, 2020

(86) PCT No.: PCT/CN2020/140848
§ 371 (c)(1),
(2) Date: Jun. 25, 2021

(87) PCT Pub. No.: WO2021/184908
PCT Pub. Date: Sep. 23, 2021

(65) Prior Publication Data
US 2022/0307898 A1 Sep. 29, 2022

(30) Foreign Application Priority Data
Mar. 20, 2020 (CN) .......................... 202010202451.9

(51) Int. Cl.
*G01J 1/18* (2006.01)
*G01J 1/46* (2006.01)
*G01J 1/44* (2006.01)

(52) U.S. Cl.
CPC . *G01J 1/18* (2013.01); *G01J 1/46* (2013.01); *G01J 2001/446* (2013.01); *G01J 2001/4473* (2013.01)

(58) Field of Classification Search
CPC ........ G01J 1/18; G01J 1/20; G01J 1/46; G01J 2001/446; G01J 2001/4473
See application file for complete search history.

(56) References Cited

U.S. PATENT DOCUMENTS

| 2005/0285017 A1* | 12/2005 | Tan | G01J 1/46 |
| | | | 250/214 R |
| 2017/0223291 A1* | 8/2017 | Ayers | H04N 23/667 |

(Continued)

FOREIGN PATENT DOCUMENTS

| CN | 105789202 A | 7/2016 |
| CN | 107314813 A | 11/2017 |

(Continued)

OTHER PUBLICATIONS

International Search Report for PCT/CN2020/140848 dated Mar. 25, 2021.

(Continued)

*Primary Examiner* — Georgia Y Epps
*Assistant Examiner* — Don J Williams
(74) *Attorney, Agent, or Firm* — Ling Wu; Stephen Yang; Ling and Yang Intellectual Property (57) ABSTRACT

Provided are a light intensity detection circuit, a light intensity detection method and an light intensity detection apparatus. The light intensity detection circuit includes a photoelectric conversion sub-circuit, a source follower sub-circuit, a reset sub-circuit, a read sub-circuit and a sense sub-circuit. The photoelectric conversion sub-circuit generates a corresponding electrical signal according to an incident light signal, and outputs it to a first node; the source (Continued)

follower sub-circuit generates a corresponding voltage signal or current signal according to the electrical signal of the first node and outputs it to a second node; the read sub-circuit reads the voltage signal or current signal of the second node to determine an incident light intensity; the reset sub-circuit provides a voltage at a offset voltage terminal to the first node.

10 Claims, 7 Drawing Sheets

(56) References Cited

U.S. PATENT DOCUMENTS

| | | |
|---|---|---|
| 2018/0231671 A1 | 8/2018 | Chen |
| 2018/0249109 A1 | 8/2018 | Yang et al. |
| 2019/0250031 A1 | 8/2019 | Ding et al. |
| 2020/0162688 A1 | 5/2020 | Wang |

FOREIGN PATENT DOCUMENTS

| | | |
|---|---|---|
| CN | 108419031 A | 8/2018 |
| CN | 108447941 A | 8/2018 |
| CN | 109327666 A | 2/2019 |
| CN | 111337125 A | 6/2020 |
| EP | 0977268 A2 | 2/2000 |

OTHER PUBLICATIONS

Office Action dated Feb. 20, 2021 for Chinese Patent Application No. 202010202451.9 and English Translation.

\* cited by examiner

A reset sub-circuit provides a reference voltage provided by a offset voltage terminal to a first node, and a sense sub-circuit senses a voltage of a second node. ~ 100

The reset sub-circuit provides an offset voltage provided by the offset voltage terminal to the first node, wherein the offset voltage is equal to a difference between a reset voltage and the voltage of the second node sensed by the sense sub-circuit. ~ 200

A photoelectric conversion sub-circuit generates a corresponding electrical signal according to an incident light signal and outputs it to the first node. ~ 300

The source follower sub-circuit generates a corresponding voltage signal or current signal according to the electrical signal of the first node and outputs it to the second node. ~ 400

A read sub-circuit reads the voltage signal or current signal of the second node to determine an incident light intensity. ~ 500

FIG. 11

LIGHT INTENSITY DETECTION CIRCUIT, LIGHT INTENSITY DETECTION METHOD AND LIGHT INTENSITY DETECTION APPARATUS

CROSS-REFERENCE TO RELATED APPLICATION

The present application claims the priority of Chinese patent application No. 202010202451.9, filed to the CNIPA on Mar. 20, 2020 and entitled "Light Intensity Detection Circuit, Light Intensity Detection Method and Light Intensity Detection Apparatus", the content of which should be regarded as being incorporated into the present application by reference.

TECHNICAL FIELD

Embodiments of the present disclosure relate to, but are not limited to, the technical field of display, in particular to a light intensity detection circuit, a light intensity detection method and a light intensity detection apparatus.

BACKGROUND

X-ray inspection is widely used in fields such as medical treatment (e.g. chest X-ray), nondestructive testing (e.g. metal crack detection), security inspection, air transportation, etc. X-ray flat panel detectors include direct flat panel detectors and indirect flat panel detectors. Indirect flat panel detectors include Charge Coupled Device (CCD), complementary metal oxide semiconductor (CMOS), amorphous silicon and other types, among which amorphous silicon flat panel detectors have larger imaging area and lower distortion compared with CMOS and CCD flat panel detectors.

Passive Pixel Sensor (PPS) structure provides a compact solution for large-area X-ray flat panel detectors, which may maximize a fill factor. However, after detecting a charge signal induced by light, a passive pixel sensor circuit is directly transmitted to a readout circuit without amplification, and thus it is so noisy that is not suitable for applying to high-precision X-ray detectors. Thin Film Transistors (TFT) are added in an Active Pixel Sensor (APS) circuit based on the passive pixel sensor circuit, which may significantly improve a signal readout speed and reduce a signal-to-noise ratio. Therefore, more and more attention has been paid to applications with high frame rate and high definition.

However, because amplification gain of each pixel unit is related to a threshold voltage of an amplification transistor in the pixel unit, and the threshold voltage of different amplification transistors may be different due to drift phenomenon, making sensitivity of different pixel units different, that is, uniformity of a plurality of pixel units is poor.

SUMMARY

The following is a summary of subject matter described in detail herein. This summary is not intended to limit the protection scope of the claims.

An embodiment of the present disclosure provides a light intensity detection circuit which includes a photoelectric conversion sub-circuit, a source follower sub-circuit, a reset sub-circuit, a read sub-circuit and a sense sub-circuit, wherein the photoelectric conversion sub-circuit is configured to generate a corresponding electrical signal according to an incident light signal and output it to a first node; the source follower sub-circuit is configured to generate a corresponding voltage signal or current signal according to the electrical signal of the first node and output it to a second node; the read sub-circuit is configured to read a voltage signal or a current signal of the second node to determine an incident light intensity; the reset sub-circuit is configured to provide a voltage at a offset voltage terminal to the first node, wherein the voltage at the offset voltage terminal includes a reference voltage and an offset voltage, and the offset voltage is equal to a difference between a reset voltage and a voltage of the second node sensed by the sense sub-circuit; the sense sub-circuit is configured to sense the voltage of the second node when the voltage of the first node is a reference voltage.

In some possible implementations, the read sub-circuit includes a first transistor located inside a pixel unit and an external read integrated circuit located outside the pixel unit; a control electrode of the first transistor is connected to a read control terminal, a first electrode of the first transistor is connected to the second node, and a second electrode of the first transistor is connected to the external read integrated circuit.

In some possible implementations, the photoelectric conversion sub-circuit includes a photodiode, and the source follower sub-circuit includes a second transistor, wherein an anode terminal of the photodiode is connected to a bias voltage terminal, and a cathode terminal of the photodiode is connected to the first node; a control electrode of the second transistor is connected to the first node, a first electrode of the second transistor is connected to a first voltage terminal, and a second electrode of the second transistor is connected to the second node.

In some possible implementations, the reset sub-circuit includes a third transistor, wherein a control electrode of the third transistor is connected to a reset control terminal, a first electrode of the third transistor is connected to an offset voltage terminal, and a second electrode of the third transistor is connected to the first node.

In some possible implementations, the sense sub-circuit includes a fourth transistor located inside a pixel unit and an external sense circuit located outside the pixel unit, wherein the external sense circuit includes a capacitor and a differential amplifier, wherein a control electrode of the fourth transistor is connected to a sense control terminal, a first electrode of the fourth transistor is connected to the second node, and a second electrode of the fourth transistor is connected to an end of the capacitor; the end of the capacitor is further connected to a negative input terminal of the differential amplifier, and the other end of the capacitor is grounded; a positive input terminal of the differential amplifier is connected to a reference voltage terminal, and an output terminal of the differential amplifier is connected to an sense end.

In some possible implementations, the read sub-circuit includes a first transistor inside a pixel unit and an external read integrated circuit outside the pixel unit, the photoelectric conversion sub-circuit includes a photodiode, the source follower sub-circuit includes a second transistor, the reset sub-circuit includes a third transistor, and the sense sub-circuit includes a fourth transistor inside the pixel unit and an external sense circuit outside the pixel unit, wherein the external sense circuit includes a capacitor and a differential amplifier; wherein a control electrode of the first transistor is connected to a read control terminal, a first electrode of the first transistor is connected to the second node, and a second electrode of the first transistor is connected to the external read integrated circuit; an anode terminal of the photodiode is connected to a bias voltage terminal, and a cathode terminal of the photodiode is connected to the first node; a control electrode of the second transistor is connected to the first node, a first electrode of the second transistor is connected to a first voltage terminal, and a second electrode of the second transistor is connected to the second node; a control electrode of the third transistor is connected to a reset control terminal, a first electrode of the third transistor is connected to the offset voltage terminal, and a second electrode of the third transistor is connected to the first node; wherein a control electrode of the fourth transistor is connected to a sense control terminal, a first electrode of the fourth transistor is connected to the second node, and a second electrode of the fourth transistor is connected to an end of the capacitor; the end of the capacitor is further connected to a negative input terminal of the differential amplifier, and the other end of the capacitor is grounded; a positive input terminal of the differential amplifier is connected to a reference voltage terminal, and an output terminal of the differential amplifier is connected to an sense end.

In some possible implementations, the light intensity detection circuit further includes a multiplexing sub-circuit, which includes a first transistor located in a pixel unit and a multiplexer located outside the pixel unit, wherein the sense sub-circuit is an external sense circuit located outside the pixel unit, and the read sub-circuit is an external read integrated circuit located outside the pixel unit; wherein a control electrode of the first transistor is connected to a read control terminal, a first electrode of the first transistor is connected to the second node, and a second electrode of the first transistor is connected to an input channel of the multiplexer; an output channel of the multiplexer is connected to the read sub-circuit, and the other output channel of the multiplexer is connected to the sense sub-circuit.

In some possible implementations, the photoelectric conversion sub-circuit includes a photodiode; the source follower sub-circuit includes a second transistor; the reset sub-circuit includes a third transistor; the light intensity detection circuit further comprises a multiplexing sub-circuit, and the multiplexing sub-circuit includes a first transistor located in a pixel unit and a multiplexer located outside the pixel unit, and the sense sub-circuit is an external sense circuit located outside the pixel unit; the read sub-circuit is an external read integrated circuit located outside the pixel unit; wherein an anode terminal of the photodiode is connected to a bias voltage terminal, and a cathode terminal of the photodiode is connected to the first node; a control electrode of the second transistor is connected to the first node, a first electrode of the second transistor is connected to a first voltage terminal, and a second electrode of the second transistor is connected to the second node; a control electrode of the third transistor is connected to a reset control terminal, a first electrode of the third transistor is connected to the offset voltage terminal, and a second electrode of the third transistor is connected to the first node; a control electrode of the first transistor is connected to a read control terminal, a first electrode of the first transistor is connected to the second node, and a second electrode of the first transistor is connected to an input channel of the multiplexer; an output channel of the multiplexer is connected to the read sub-circuit, and the other output channel of the multiplexer is connected to the sense sub-circuit.

An embodiment of the present disclosure further provides a light intensity detection apparatus which includes the light intensity detection circuit as described above.

An embodiment of the present disclosure further provides a light intensity detection method, which includes: a reset sub-circuit provides a reference voltage provided by an offset voltage terminal to a first node, and a sense sub-circuit senses a voltage of a second node; the reset sub-circuit provides an offset voltage provided by the offset voltage terminal to the first node, wherein the offset voltage is equal to a difference between a reset voltage and the voltage of the second node sensed by the sense sub-circuit; the photoelectric conversion sub-circuit generates a corresponding electrical signal according to an incident light signal and outputs it to the first node; a source follower sub-circuit generates a corresponding voltage signal or current signal according to the electrical signal of the first node and outputs it to a second node; a read sub-circuit reads the voltage signal or current signal of the second node to determine an incident light intensity.

Other aspects will become apparent upon reading and understanding the brief description of the drawings and embodiments of the present disclosure.

BRIEF DESCRIPTION OF DRAWINGS

Accompanying drawings are used to facilitate understanding of technical solutions of embodiments of the present disclosure and form a part of the specification, and explain the technical solutions of the present disclosure together with the embodiments of the present disclosure, which do not constitute a limitation on the technical solutions of the embodiments of the present disclosure.

Description of the drawing reference signs:

| | |
|---|---|
| RST—reset control terminal; | Read—read control terminal; |
| VDD—the first voltage terminal; | COMP—offset voltage terminal; |

| | |
|---|---|
| Bias—bias voltage terminal; | Sen—sense control terminal; |
| N1~N2—node; | C—capacitor; |
| T1~T4—transistor; | Sense—sense terminal; |
| AMP—differential amplifier; | D—photodiode; |
| MUX—multiplexer; | Control—control terminal. |

DETAILED DESCRIPTION

To make the objects, technical solutions and advantages of the present invention more clear, embodiments of the present invention will be described in detail below with reference to the drawings. It should be illustrated that embodiments in the present disclosure and features in the embodiments may be combined with each other randomly if there is no conflict.

Unless otherwise defined, technical terms or scientific terms used in the embodiments of the present disclosure shall have common meanings as construed by those of ordinary skills in the art to which the present disclosure pertains. The words "first", "second" and the like used in the embodiments of the present disclosure do not represent any order, quantity or importance, but are merely used to distinguish among different components. Similar words such as "including" or "comprising" mean that elements or articles preceding the words cover elements or articles listed after the words and their equivalents, and do not exclude other elements or articles.

Those skilled in the art may understand that transistors used in the embodiments of the present disclosure may be thin film transistors or field effect transistors or other devices with same characteristics. The thin film transistor used in the embodiments of the present disclosure may be an oxide semiconductor transistor. Because a source and a drain of a transistor used here are symmetrical, the source and the drain may be interchanged. In the embodiments of the present disclosure, one of two electrodes of the transistor other than a gate is referred to as a first electrode and the other electrode is referred to as a second electrode to distinguish the two electrodes. The first electrode may be a source or a drain, and the second electrode may be a drain or a source.

The imaging principle of indirect flat panel detector is as follows: X-ray irradiates an interior of a detector, first passes through a Scintillator, whose function is to convert X-ray into visible light, and then the visible light is transmitted to a glass backplane, which contains a photodiode and a switch circuit (such as TFT), and the photodiode receives visible light to excite electrons to a capacitor for storage, and then a drive circuit at scan side (such as Gate side) turns on a switch circuit row by row to scan, and then a Data side reads signals, and a chip converts an analog signal into a digital signal, and finally presents it as an image.

In recent years, in order to further improve performance and universality of flat panel detectors, dynamic flat panel detectors have become a future trend, and high frame rate, high definition and low dose are directions of future research. Due to its signal amplification effect, APS pixel design may greatly improve sensitivity and remedy a problem of insufficient signal quantity under high frame rate, which has been regarded as one of the pixel structures for dynamic flat panel detectors.

An amplification gain of APS is related to a threshold voltage, but threshold voltages of different pixel units may be different, especially thin film transistor (TFT) devices of the amorphous silicon (a-Si), oxide (IGZO), low temperature polysilicon (LTPS), whose threshold voltage drifts obviously, for example, the threshold voltage offset $\Delta Vth$ of the LTPS NMOS TFT under positive gate bias stress (+20 volts, 2 hours) may be plus 1 volt (+1 volt), so that sensitivity of a plurality of pixel units may have great differences.

An embodiment of the present disclosure provides a light intensity detection circuit which includes a photoelectric conversion sub-circuit, a source follower sub-circuit, a reset sub-circuit, a read sub-circuit and a sense sub-circuit.

The photoelectric conversion sub-circuit is configured to generate a corresponding electrical signal according to the incident light signal and output it to a first node; the source follower sub-circuit is configured to generate a corresponding voltage signal or current signal according to an electrical signal of the first node and output it to a second node; the read sub-circuit is configured to read a voltage signal or current signal of the second node to determine an incident light intensity; the reset sub-circuit is configured to provide a voltage from a offset voltage terminal to the first node, wherein the voltage at the offset voltage terminal includes a reference voltage and a offset voltage, and the offset voltage is equal to a difference between a reset voltage and a voltage of the second node sensed by the sense sub-circuit; the sense sub-circuit is configured to sense the voltage of the second node when the voltage of the first node is a reference voltage.

According to the light intensity detection circuit provided by the embodiment of the disclosure, the reset sub-circuit provides a reference voltage to the first node, the sense sub-circuit senses a voltage of the second node, and the reset sub-circuit provides the offset voltage to the first node based on the sensed voltage of the second node, thus eliminating sensitivity differences between different pixel units caused by changes of threshold voltages and improving uniformity of a plurality of pixel units.

Figure 1:
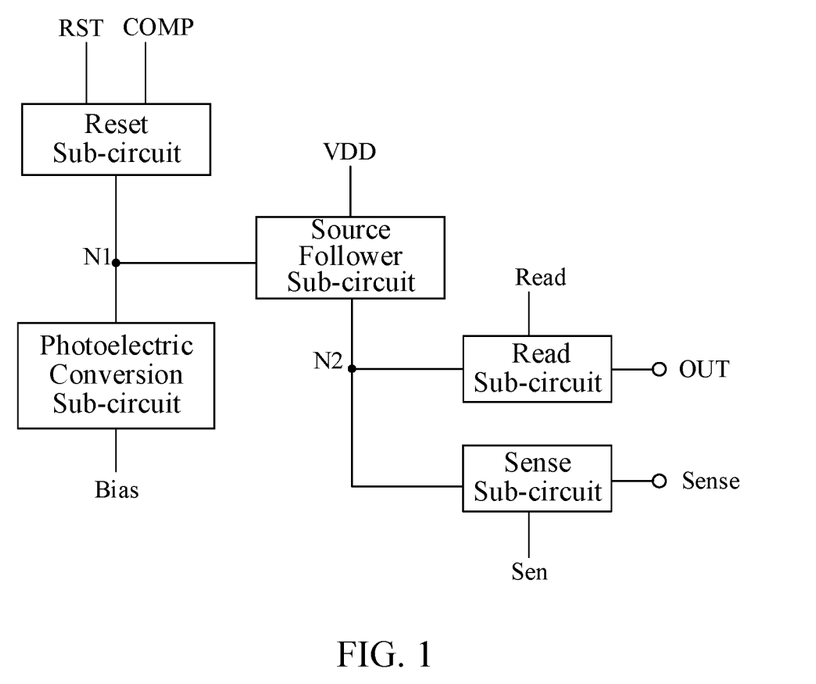
FIG. 1 is a schematic diagram of a structure of a light intensity detection circuit according to an embodiment of the present disclosure.

FIG. 1 is a schematic diagram of a structure of a light intensity detection circuit according to an embodiment of the present disclosure. As shown in FIG. 1, the light intensity detection circuit of the present embodiment includes a photoelectric conversion sub-circuit, a source follower sub-circuit, a reset sub-circuit, a read sub-circuit and a sense sub-circuit.

The photoelectric conversion sub-circuit is respectively connected to a bias voltage terminal (Bias) and the first node N1, and is configured to generate corresponding electrical signals according to the incident light signals and output them to the first node N1; The source follower sub-circuit is respectively connected to the first node N1, the first voltage terminal VDD and the second node N2, and is configured to generate a corresponding voltage signal or current signal according to the electrical signal of the first node N1 and output it to the second node N2; the read sub-circuit is respectively connected to the second node N2, a read control terminal (Read) and the output terminal OUT, and is configured to read the voltage signal or current signal of the second node N2 under the control of the read control terminal (Read) to determine an incident light intensity; the reset sub-circuit is respectively connected to a reset control terminal RST, a offset voltage terminal COMP and the first node N1, and is configured to provide a voltage of the offset voltage terminal COMP to the first node N1 under the control of the reset control terminal RST, wherein the voltage of the offset voltage terminal COMP includes a reference voltage Vref or a offset voltage Vcomp, the offset voltage is equal to a difference between the reset voltage and the voltage of the second node N2 sensed by the sense sub-circuit; the sense sub-circuits are respectively connected to a sense control terminal Sen, the second node N2 and a sense terminal Sense, and are configured to sense a voltage of the second node N2 under the control of the sense control terminal Sen when a voltage of the first node N1 is a reference voltage Vref.

The light intensity detection circuit according to the embodiment of the disclosure eliminates sensitivity differences between different pixel units caused by changes of threshold voltages, and improves uniformity of a plurality of pixel units.

Figure 2:
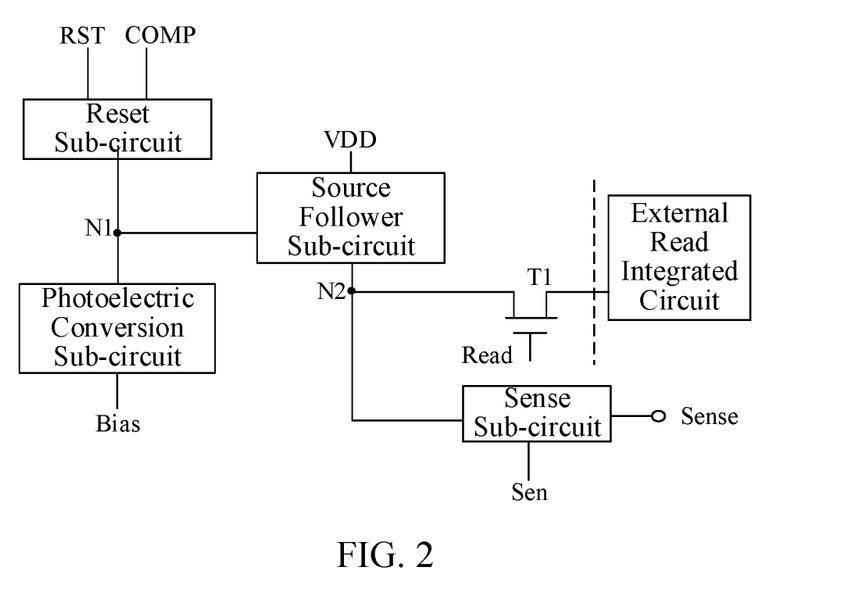
FIG. 2 is an equivalent circuit diagram of a read sub-circuit according to an embodiment of the present disclosure.

In an exemplary embodiment, FIG. 2 is an equivalent circuit diagram of a read sub-circuit according to an embodiment of the present disclosure. As shown in FIG. 2, the read sub-circuit includes a first transistor T1 located inside a pixel unit and an external read integrated circuit located outside a pixel unit.

A control electrode of the first transistor T1 is connected to the read control terminal (Read), a first electrode of the first transistor T1 is connected to the second node N2, and a second electrode of the first transistor T1 is connected to the external read integrated circuit.

An exemplary structure of the read sub-circuit is shown in FIG. 2. Those skilled in the art may easily understand that implementations of the read sub-circuit are not limited thereto as long as their respective functions may be achieved.

Figure 3:
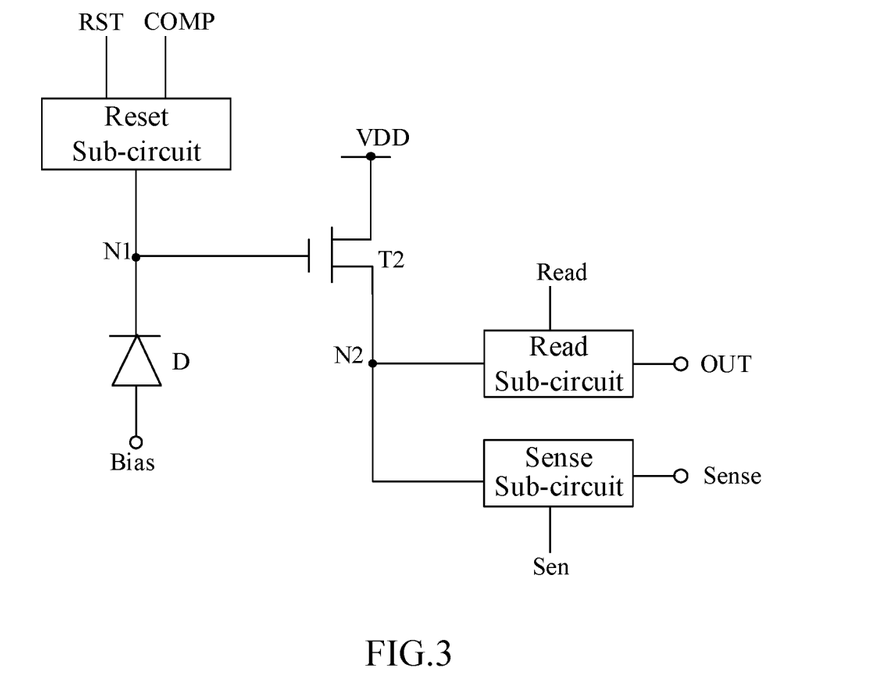
FIG. 3 is an equivalent circuit diagram of a photoelectric conversion sub-circuit and a source follower sub-circuit according to an embodiment of the present disclosure.

In an exemplary embodiment, FIG. 3 is an equivalent circuit diagram of a photoelectric conversion sub-circuit and a source follower sub-circuit according to an embodiment of the disclosure. As shown in FIG. 3, the photoelectric conversion sub-circuit includes a photodiode D located in a pixel unit, the source follower sub-circuit includes: a second transistor T2 located in a pixel unit.

An anode terminal of the photodiode D is connected to a bias voltage terminal (Bias), and a cathode terminal of the photodiode D is connected to the first node N1; a control electrode of the second transistor T2 is connected to the first node N1, a first electrode of the second transistor T2 is connected to a first voltage terminal VDD, and a second electrode of the second transistor T2 is connected to the second node N2.

Figure 4:
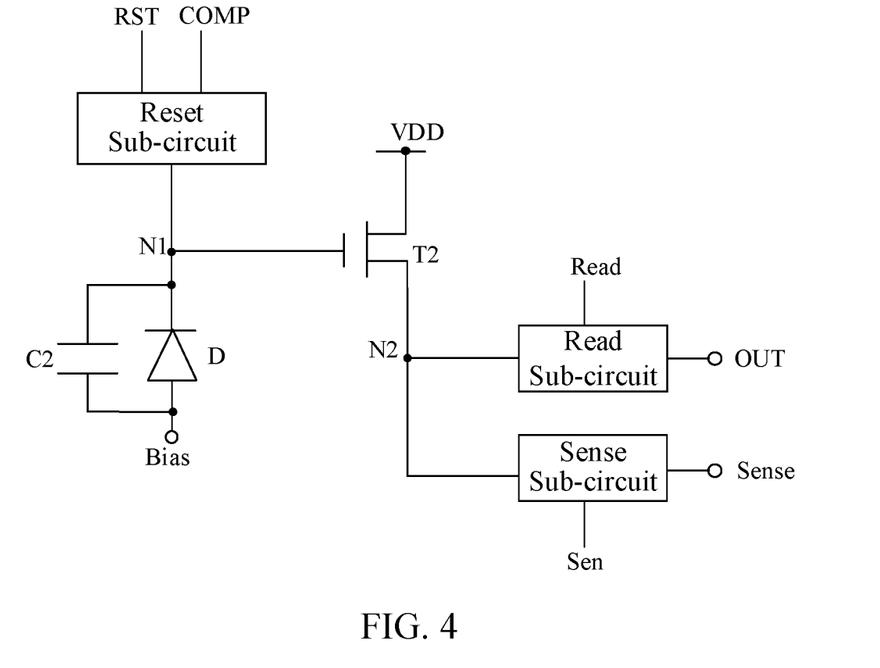
FIG. 4 is another equivalent circuit diagram of a photoelectric conversion sub-circuit and a source follower sub-circuit according to an embodiment of the present disclosure.

In another exemplary embodiment, FIG. 4 is another equivalent circuit diagram of a photoelectric conversion sub-circuit and a source follower sub-circuit according to an embodiment of the present disclosure. As shown in FIG. 4, the photoelectric conversion sub-circuit may include a photodiode D and a second capacitor C2 located in a pixel unit, and the source follower sub-circuit includes a second transistor T2 located in a pixel unit.

An anode terminal of the photodiode D is connected to a bias voltage terminal (Bias), a cathode terminal of the photodiode D is connected to the first node N1, an end of the second capacitor C2 is connected to the bias voltage terminal (Bias), and the other end of the second capacitor C2 is connected to the first node N1. A control electrode of the second transistor T2 is connected to the first node N1, a first electrode of the second transistor T2 is connected to a first voltage terminal VDD, and a second electrode of the second transistor T2 is connected to the second node N2.

Two exemplary structures of the photoelectric conversion sub-circuit and the source follower sub-circuit are shown in FIGS. 3 and 4. Those skilled in the art may easily understand that implementations of a photoelectric conversion sub-circuit and a source follower sub-circuit are not limited thereto as long as their respective functions may be achieved.

Figure 5:
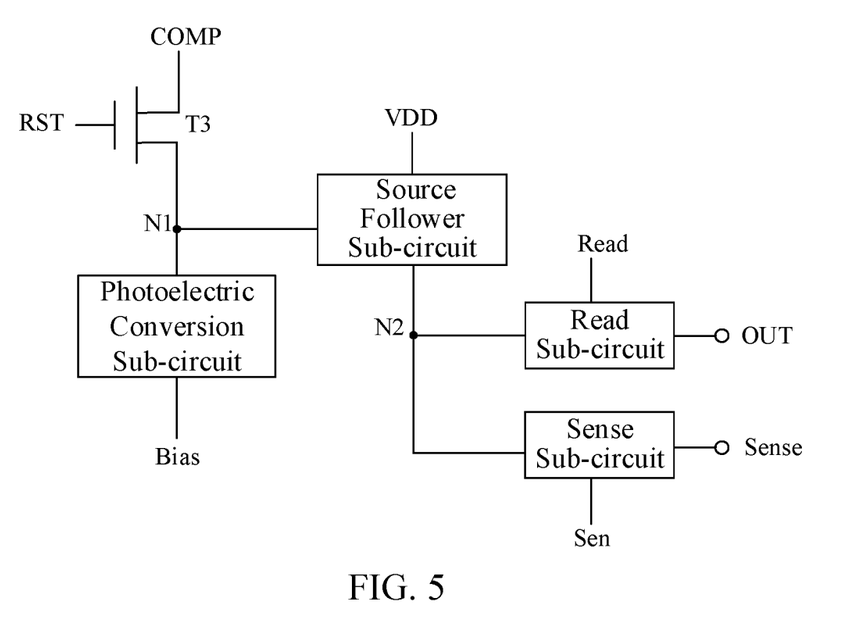
FIG. 5 is an equivalent circuit diagram of a reset sub-circuit according to an embodiment of the present disclosure.

In an exemplary embodiment, FIG. 5 is an equivalent circuit diagram of a reset sub-circuit according to an embodiment of the present disclosure. As shown in FIG. 5, the reset sub-circuit includes: a third transistor T3 located in a pixel unit.

A control electrode of the third transistor T3 is connected to a reset control terminal RST, a first electrode of the third transistor T3 is connected to the offset voltage terminal COMP, and a second electrode of the third transistor T3 is connected to the first node N1.

An exemplary structure of the reset sub-circuit is shown in FIG. 5. Those skilled in the art may easily understand that implementations of the reset sub-circuit are not limited thereto as long as their respective functions may be achieved.

Figure 6:
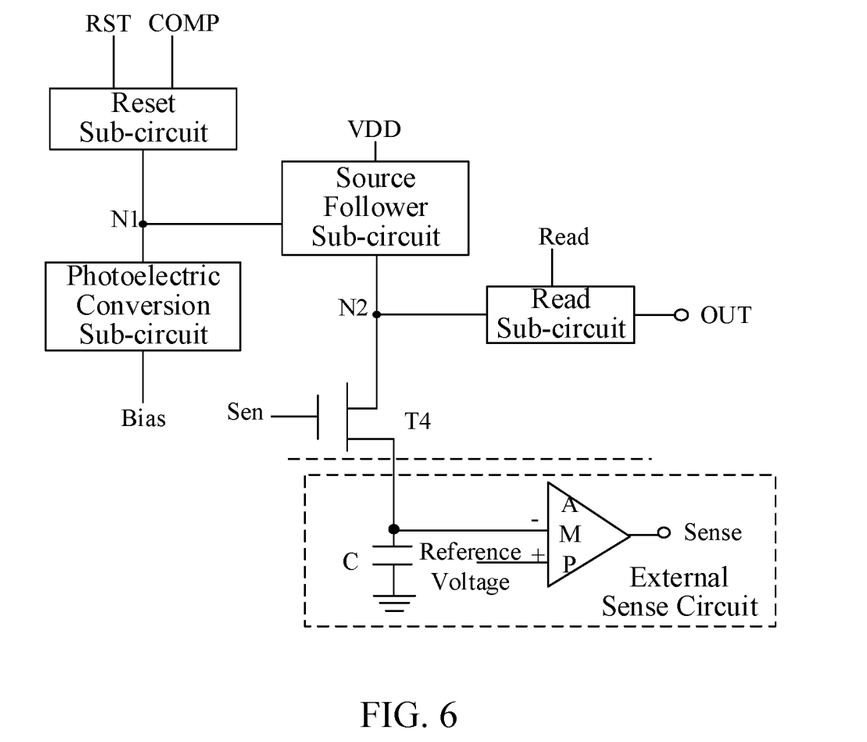
FIG. 6 is an equivalent circuit diagram of a sense sub-circuit according to an embodiment of the present disclosure.

In an exemplary embodiment, FIG. 6 is an equivalent circuit diagram of a sense sub-circuit according to an embodiment of the present disclosure. As shown in FIG. 6, the sense sub-circuit includes a fourth transistor T4 located inside a pixel unit and an external sense circuit located outside the pixel unit.

A control electrode of the fourth transistor T4 is connected to a sense control terminal Sen, a first electrode of the fourth transistor T4 is connected to the second node N2, and a second electrode of the fourth transistor T4 is connected to the external sense circuit.

In this embodiment, as shown in FIG. 6, the external sense circuit may include a capacitor C and a differential amplifier AMP, wherein an end of the capacitor C is connected to the second electrode of the fourth transistor T4, and the other end of the capacitor C is grounded; a negative input terminal of the differential amplifier AMP is connected to the second electrode of the fourth transistor T4, a positive input terminal of the differential amplifier AMP is connected to a reference voltage terminal, and an output terminal of the differential amplifier AMP is connected to a sense terminal.

An exemplary structure of the sense sub-circuit is shown in FIG. 6. Those skilled in the art may easily understand that implementations of the sense sub-circuit are not limited thereto as long as their respective functions may be achieved.

Figure 7:
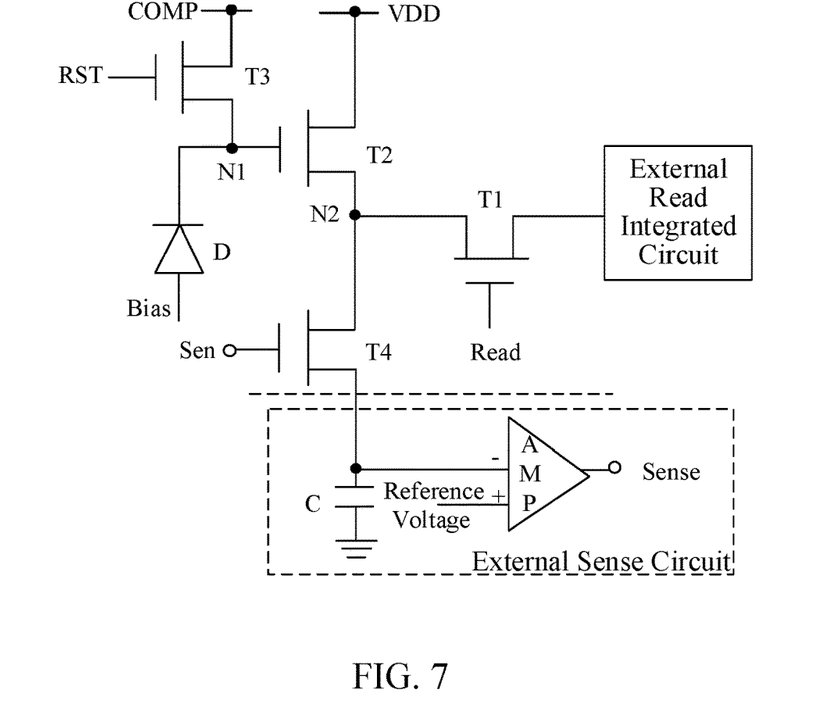
FIG. 7 is a first equivalent circuit diagram of a light intensity detection circuit according to an embodiment of the present disclosure.

FIG. 7 is an equivalent circuit diagram of a light intensity detection circuit according to an embodiment of the present disclosure. As shown in FIG. 7, in the light intensity detection circuit according to an embodiment of the present disclosure, a read sub-circuit includes a first transistor T1 located in a pixel unit and an external read integrated circuit located outside the pixel unit; a photoelectric conversion sub-circuit includes a photodiode D located in the pixel unit; a source follower sub-circuit includes a second transistor T2 located in the pixel unit; a reset sub-circuit includes a third transistor T3 located in the pixel unit, and a sense sub-circuit includes a fourth transistor T4 located in the pixel unit and an external sense circuit located outside the pixel unit.

A control electrode of the first transistor T1 is connected to a read control terminal (Read), a first electrode of the first transistor T1 is connected to the second node N2, and a second electrode of the first transistor T1 is connected to the external read integrated circuit; An anode terminal of the photodiode D is connected to a bias voltage terminal (Bias), and a cathode terminal of the photodiode D is connected to the first node N1; a control electrode of the second transistor T2 is connected to the first node N1, a first electrode of the second transistor T2 is connected to a first voltage terminal VDD, and a second electrode of the second transistor T2 is connected to the second node N2; a control electrode of the third transistor T3 is connected to a reset control terminal RST, a first electrode of the third transistor T3 is connected to the offset voltage terminal COMP, a second electrode of the third transistor T3 is connected to the first node N1, a control electrode of the fourth transistor T4 is connected to a sense control terminal Sen, a first electrode of the fourth transistor T4 is connected to the second node N2, and a second electrode of the fourth transistor T4 is connected to an external sense circuit.

Exemplary structures of the sense sub-circuit, the read sub-circuit, the photoelectric conversion sub-circuit, the source follower sub-circuit and the reset sub-circuit are shown in FIG. 7. Those skilled in the art may easily understand that implementations of the above various sub-circuits are not limited thereto as long as their respective functions may be achieved.

In an exemplary embodiment, the first transistor T1 to the fourth transistor T4 may all be N-type thin film transistors or P-type thin film transistors, process flows may be unified and process preparation procedures may be reduced, which is beneficial for improving the yield of products. Considering that a leakage current of a low-temperature polysilicon thin film transistor is smaller, transistors of the embodiment of the present disclosure may be low-temperature polysilicon thin film transistors, and thin film transistors with a bottom gate structure or thin film transistors with a top gate structure may be selected to be as the thin film transistors, as long as a switch function may be achieved.

Figure 8:
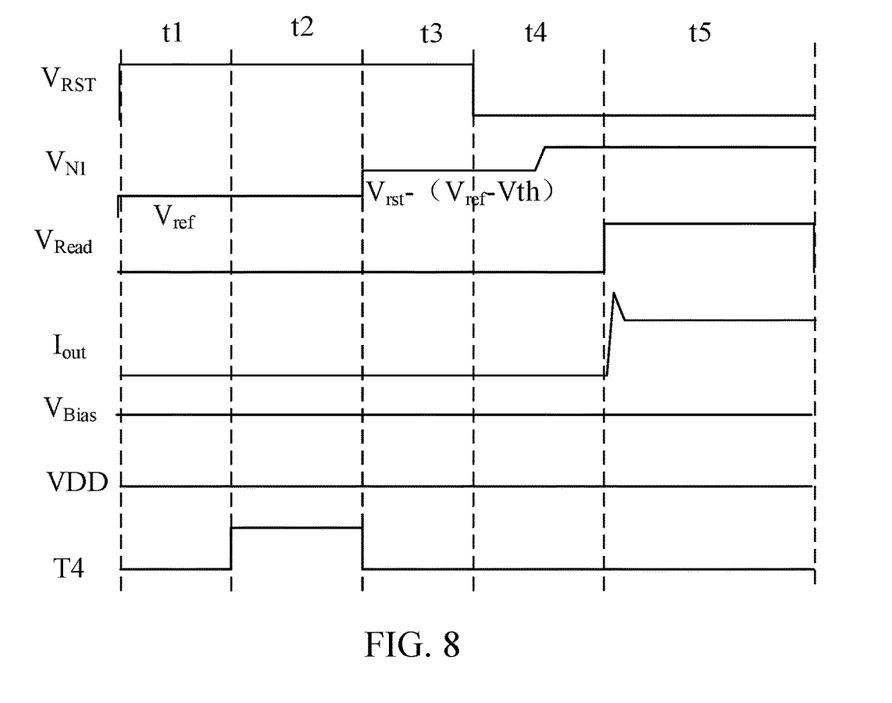
FIG. 8 is a working timing diagram of a light intensity detection circuit according to an embodiment of the present disclosure.

The following describes an example of a working process of the light intensity detection circuit with reference to the light intensity detection circuit shown in FIG. 7 and the working timing diagram shown in FIG. 8. As shown in FIG. 8, the working process may include:

In a first stage t1, i.e., a reference voltage input stage, turning on a third transistor T3, and inputting a reference voltage Vref provided by a offset voltage terminal COMP to a first node N1 through the third transistor T3;

in a second stage t2, i.e., a sense stage, turning on a fourth transistor T4, and an external sense circuit read a voltage of a second node N2 through the fourth transistor T4, and giving feedback of the sensed voltage of the second node N2 to the offset voltage terminal COMP;

in a third stage t3, i.e., a reset stage, turning on the third transistor T3, and inputting a offset voltage Vcomp provided by the offset voltage terminal COMP to the first node N1 through the third transistor T3, wherein Vcomp=Vrst−(Vref−Vth), Vrst is a reset voltage, and Vth is a threshold voltage of a second transistor T2;

in a fourth stage t4, i.e., an integration stage, inputting a bias voltage to a photodiode D through a bias voltage terminal (Bias), making the photodiode D in a reverse bias state, the photodiode D is exposed in the light to collect light signals, converting the collected light signals into corresponding voltage signals, and outputting them to the first node N1; the second transistor T2 generating a corresponding current signal according to a voltage signal of the first node N1 (in other embodiments, it may also generate a corresponding voltage signal according to a voltage of the first node N1) and outputting it to the second node N2;

in a fifth stage t5, i.e., a read stage, turning on a first transistor T1, and an external read integrated circuit read a current signal of the second node N2 through the first transistor T1 to determine an incident light intensity.

The light intensity detection circuit according to the embodiment of the present disclosure, the external sense circuit gives the feedback of the voltage of the second node N2 (which is related to the threshold voltage Vth) to the offset voltage terminal COMP by sensing the voltage of the second node N2 at the sense stage, and introduces changes of the threshold voltages Vth to the first node N1 by resetting the transistors, so that the subsequent amplification current is independent of the threshold voltage Vth, and an effect of the threshold voltage Vth is eliminated, thereby eliminating sensitivity differences between different pixel units caused by changes of the threshold voltages and improving uniformity of a plurality of pixel units.

In another exemplary embodiment, the light intensity detection circuit further includes a multiplexing sub-circuit, which includes a first transistor T1 located inside a pixel unit and a multiplexer MUX located outside the pixel unit. The number of transistors in a pixel unit may be further reduced to maximize a fill factor by using a multiplexer MUX.

Figure 9:
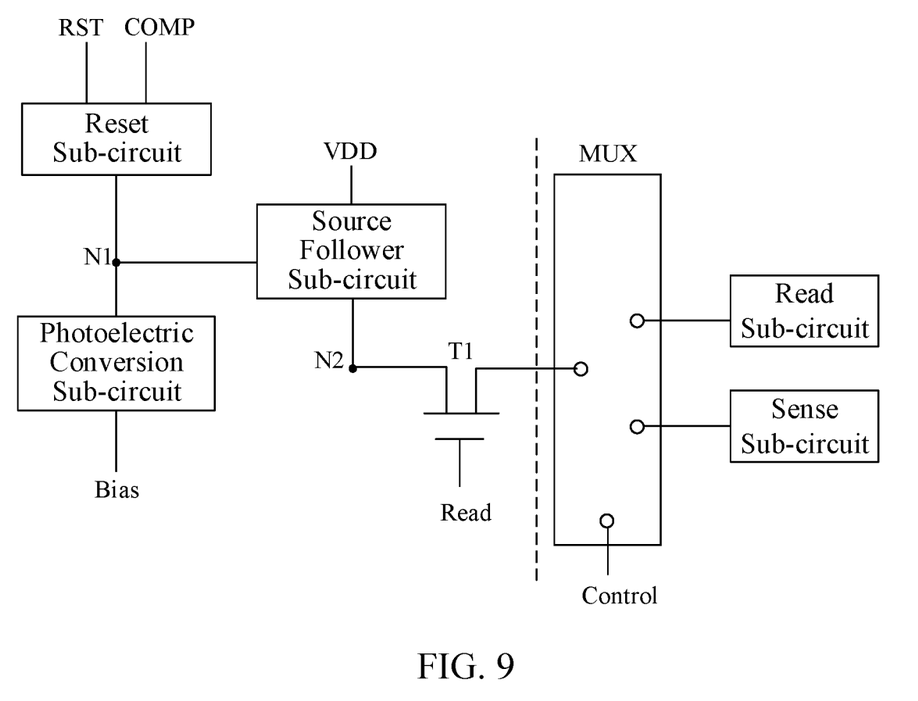
FIG. 9 is an equivalent circuit diagram of a multiplexing sub-circuit according to an embodiment of the present disclosure.

In an exemplary embodiment, FIG. 9 is an equivalent circuit diagram of a multiplexing sub-circuit according to an embodiment of the present disclosure. As shown in FIG. 9, the multiplexing sub-circuit includes a first transistor T1 located inside a pixel unit and a multiplexer MUX located outside the pixel unit, the sense sub-circuit is an external sense circuit located outside the pixel unit, and the read sub-circuit is an external read integrated circuit located outside the pixel unit.

A control electrode of the first transistor T1 is connected to a read control terminal (Read), a first electrode of the first transistor T1 is connected to the second node N2, and a second electrode of the first transistor T1 is connected to an input channel of a multiplexer MUX; an output channel of the multiplexer MUX is connected to the read sub-circuit, and the other output channel of the multiplexer MUX is connected to the sense sub-circuit.

An exemplary structure of the multiplexing sub-circuit is shown in FIG. 9. Those skilled in the art may easily understand that implementations of the multiplexing sub-circuit are not limited thereto as long as their respective functions may be achieved.

Figure 10:
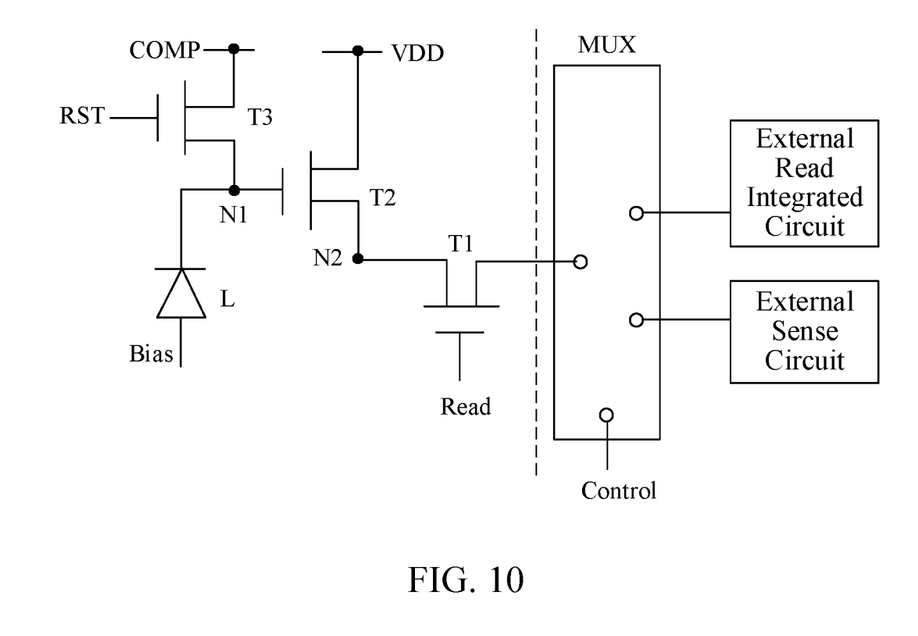
FIG. 10 is a second equivalent circuit diagram of a light intensity detection circuit according to an embodiment of the present disclosure.

FIG. 10 is an equivalent circuit diagram of a light intensity detection circuit according to an embodiment of the present disclosure. As shown in FIG. 10, in the light intensity detection circuit according to an embodiment of the present disclosure, a photoelectric conversion sub-circuit includes a photodiode D located in a pixel unit, a source follower sub-circuit includes a second transistor T2 located in the pixel unit; a reset sub-circuit includes a third transistor T3 located in the pixel unit; the light intensity detection circuit further includes a multiplexing sub-circuit, which includes a first transistor T1 located inside the pixel unit and a multiplexer MUX located outside the pixel unit, the sense sub-circuit is an external sense circuit located outside the pixel unit, and the read sub-circuit is an external read integrated circuit located outside the pixel unit.

An anode terminal of the photodiode D is connected to a bias voltage terminal (Bias), and a cathode terminal of the photodiode D is connected to the first node N1; a control electrode of the second transistor T2 is connected to the first node N1, a first electrode of the second transistor T2 is connected to a first voltage terminal VDD, and a second electrode of the second transistor T2 is connected to the second node N2. A control electrode of the third transistor T3 is connected to a reset control terminal RST, a first electrode of the third transistor T3 is connected to a offset voltage terminal COMP, and a second electrode of the third transistor T3 is connected to the first node N1; a control electrode of the first transistor T1 is connected to a read control terminal (Read), a first electrode of the first transistor T1 is connected to the second node N2, and a second electrode of the first transistor T1 is connected to an input channel of the multiplexer MUX; an output channel of the multiplexer MUX is connected to the read sub-circuit, and the other output channel of the multiplexer MUX is connected to the sense sub-circuit.

Exemplary structures of the sense sub-circuit, the read sub-circuit, the photoelectric conversion sub-circuit, the source follower sub-circuit and the reset sub-circuit are shown in FIG. 10. Those skilled in the art may easily understand that implementations of the above various sub-circuits are not limited thereto as long as their respective functions may be achieved.

The working process of the light intensity detection circuit of this embodiment is similar to that of the foregoing embodiment, so please refer to the description of the foregoing embodiment for the working process, which will not be repeated in detail here.

An embodiment of the present disclosure further provides a light intensity detection apparatus which includes the light intensity detection circuit in any one of the aforementioned embodiments.

Figure 11:
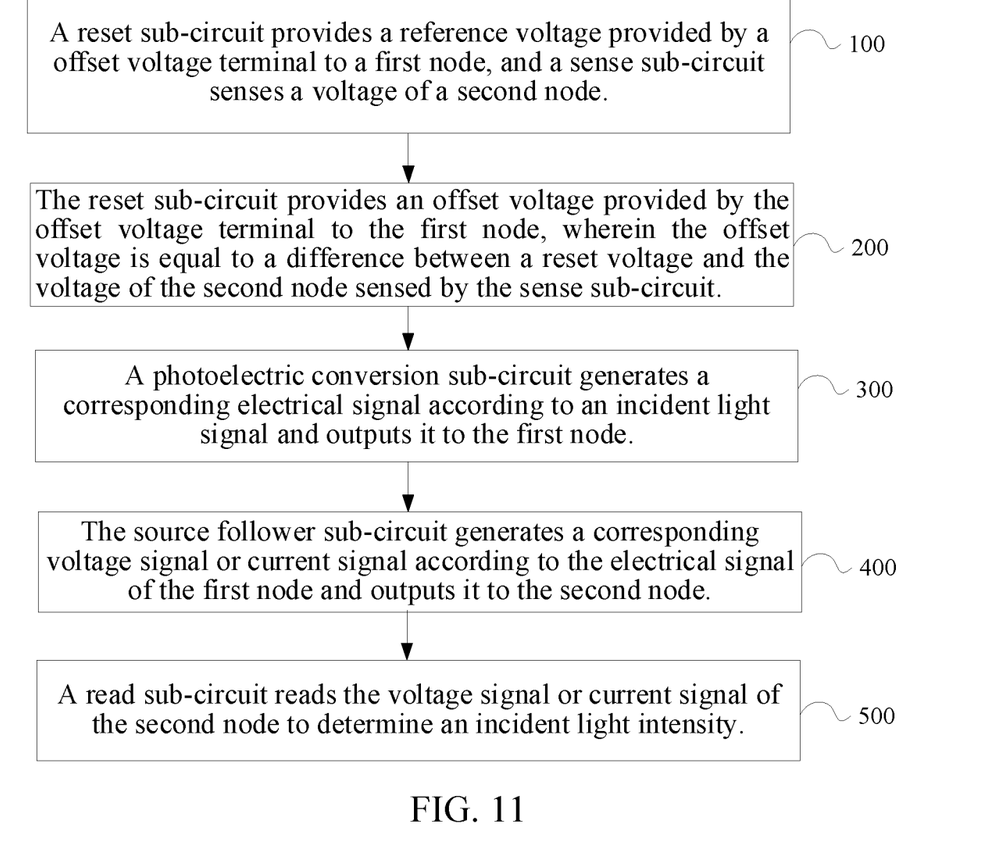
FIG. 11 is a flowchart of a light intensity detection method according to an embodiment of the present disclosure.

An embodiment of the present disclosure further provides a light intensity detection method. As shown in FIG. 11, the light intensity detection method includes acts 100 to 500.

Act 100 includes: a reset sub-circuit providing a reference voltage provided by an offset voltage terminal to a first node, and a sense sub-circuit sense a voltage of a second node.

In this act, a voltage value of the reference voltage may be low, and after a period of time, a voltage value of the second node will rise to Vref−Vth, where Vref is the reference voltage and Vth is a threshold voltage of an amplifying transistor.

Act 200 includes: the reset sub-circuit providing an offset voltage provided by the offset voltage terminal to the first node, wherein the offset voltage is equal to a difference between a reset voltage and the voltage of the second node sensed by the sense sub-circuit.

In this act, the offset voltage Vcomp=Vrst−(Vref−Vth), and Vrst is the reset voltage. Influences of the threshold voltages on voltage signals or current signals generated by the source follower sub-circuit in the subsequent acts are eliminated by providing the offset voltage to reset the first node.

Act 300 includes: a photoelectric conversion sub-circuit generating a corresponding electrical signal according to an incident light signal and outputting it to the first node.

In this act, the photoelectric conversion sub-circuit includes a photosensitive element, and the incident light signal is collected by the photosensitive element to generate a corresponding electrical signal, which is output to the first node.

Act 400 includes: the source follower sub-circuit generating a corresponding voltage signal or current signal according to the electrical signal of the first node and outputting it to the second node.

In this act, the source follower sub-circuit may generate a corresponding voltage signal according to the electrical signal of the first node and output it to the second node, or may generate a corresponding current signal according to the electrical signal of the first node and output it to the second node.

Act 500 includes: a read sub-circuit reading the voltage signal or current signal of the second node to determine an incident light intensity.

According to the light intensity detection method provided by this embodiment, the reset sub-circuit provides the reference voltage to the first node, the sense sub-circuit senses the voltage of the second node, and the reset sub-circuit provides the offset voltage to the first node according to the sensed voltage of the second node, which may monitor the changes of the threshold voltages in real time and compensate immediately to maintain a fixed amplification gain, thus eliminating the sensitivity differences between different pixel units caused by the changes of the threshold voltages, and improving the uniformity of each pixel unit.

The accompanying drawings of the embodiments of the present disclosure only involve structures involved in the embodiments of the present disclosure, and other structures may refer to general designs.

Although the embodiments disclosed in the present disclosure are as described above, the described contents are only the embodiments for facilitating understanding of the present disclosure, which are not intended to limit the present disclosure. Any person skilled in the field to which the present disclosure pertains may make any modifications and variations in the forms and details of implementation without departing from the spirit and the scope disclosed by the present disclosure. However, the patent protection scope of the present disclosure shall still be subject to the scope defined in the appended claims.

What is claimed is:

1. A light intensity detection circuit, comprising:
a photoelectric conversion sub-circuit, a source follower sub-circuit, a reset sub-circuit, a read sub-circuit and a sense sub-circuit, wherein
the photoelectric conversion sub-circuit is configured to generate a corresponding electrical signal according to an incident light signal and output the corresponding electrical signal to a first node;
the source follower sub-circuit is configured to generate a corresponding voltage signal or current signal according to the electrical signal of the first node and output the corresponding voltage signal or current signal to a second node;
the read sub-circuit is configured to read the voltage signal or the current signal of the second node to determine an incident light intensity;
the reset sub-circuit is configured to provide a voltage from an offset voltage terminal to the first node, wherein the voltage from the offset voltage terminal comprises a reference voltage and an offset voltage, and the offset voltage is equal to a difference between a reset voltage and a voltage of the second node sensed by the sense sub-circuit; and
the sense sub-circuit is configured to sense the voltage of the second node when the voltage of the first node is the reference voltage.

2. The light intensity detection circuit of claim 1, wherein the read sub-circuit comprises a first transistor located inside a pixel unit and an external read integrated circuit located outside the pixel unit;
wherein a control electrode of the first transistor is connected to a read control terminal, a first electrode of the first transistor is connected to the second node, and a second electrode of the first transistor is connected to the external read integrated circuit.

3. The light intensity detection circuit of claim 1, wherein the photoelectric conversion sub-circuit comprises a photodiode, and the source follower sub-circuit comprises a second transistor;
wherein an anode terminal of the photodiode is connected to a bias voltage terminal, and a cathode terminal of the photodiode is connected to the first node; and
a control electrode of the second transistor is connected to the first node, a first electrode of the second transistor is connected to a first voltage terminal, and a second electrode of the second transistor is connected to the second node.

4. The light intensity detection circuit of claim 1, wherein the reset sub-circuit comprises: a third transistor,
wherein a control electrode of the third transistor is connected to a reset control terminal, a first electrode of the third transistor is connected to the offset voltage terminal, and a second electrode of the third transistor is connected to the first node.

5. The light intensity detection circuit of claim 1, wherein the sense sub-circuit comprises a fourth transistor located inside a pixel unit and an external sense circuit located outside the pixel unit, wherein the external sense circuit comprises a capacitor and a differential amplifier,
wherein a control electrode of the fourth transistor is connected to a sense control terminal, a first electrode of the fourth transistor is connected to the second node, and a second electrode of the fourth transistor is connected to an end of the capacitor; and
the end of the capacitor is further connected to a negative input terminal of the differential amplifier, and the other end of the capacitor is grounded; a positive input terminal of the differential amplifier is connected to a reference voltage terminal, and an output terminal of the differential amplifier is connected to an sense end.

6. The light intensity detection circuit of claim 1, wherein the read sub-circuit comprises a first transistor inside a pixel unit and an external read integrated circuit outside the pixel unit, the photoelectric conversion sub-circuit comprises a photodiode, the source follower sub-circuit comprises a second transistor, the reset sub-circuit comprises a third transistor, and the sense sub-circuit comprises a fourth transistor inside the pixel unit and an external sense circuit outside the pixel unit, wherein the external sense circuit comprises a capacitor and a differential amplifier,
wherein a control electrode of the first transistor is connected to a read control terminal, a first electrode of the first transistor is connected to the second node, and a second electrode of the first transistor is connected to the external read integrated circuit;
an anode terminal of the photodiode is connected to a bias voltage terminal, and a cathode terminal of the photodiode is connected to the first node;
a control electrode of the second transistor is connected to the first node, a first electrode of the second transistor is connected to a first voltage terminal, and a second electrode of the second transistor is connected to the second node;
a control electrode of the third transistor is connected to a reset control terminal, a first electrode of the third transistor is connected to the offset voltage terminal, and a second electrode of the third transistor is connected to the first node;
a control electrode of the fourth transistor is connected to a sense control terminal, a first electrode of the fourth transistor is connected to the second node, and a second electrode of the fourth transistor is connected to an end of the capacitor; and
the end of the capacitor is further connected to a negative input terminal of the differential amplifier, and the other end of the capacitor is grounded; a positive input terminal of the differential amplifier is connected to a reference voltage terminal, and an output terminal of the differential amplifier is connected to an sense end.

7. The light intensity detection circuit of claim 1, wherein the light intensity detection circuit further comprises a multiplexing sub-circuit, which comprises a first transistor located in a pixel unit and a multiplexer located outside the pixel unit, wherein the sense sub-circuit is an external sense circuit located outside the pixel unit, and the read sub-circuit is an external read integrated circuit located outside the pixel unit,
wherein a control electrode of the first transistor is connected to a read control terminal, a first electrode of the first transistor is connected to the second node, and a second electrode of the first transistor is connected to an input channel of the multiplexer; and
an output channel of the multiplexer is connected to the read sub-circuit, and the other output channel of the multiplexer is connected to the sense sub-circuit.

8. The light intensity detection circuit of claim 1, wherein the photoelectric conversion sub-circuit comprises a photodiode; the source follower sub-circuit comprises a second transistor; the reset sub-circuit comprises a third transistor; the light intensity detection circuit further comprises a multiplexing sub-circuit, and the multiplexing sub-circuit comprises a first transistor located inside a pixel unit and a multiplexer located outside the pixel unit, and the sense sub-circuit is an external sense circuit located outside the pixel unit; the read sub-circuit is an external read integrated circuit located outside the pixel unit,
wherein an anode terminal of the photodiode is connected to a bias voltage terminal, and a cathode terminal of the photodiode is connected to the first node;
a control electrode of the second transistor is connected to the first node, a first electrode of the second transistor is connected to a first voltage terminal, and a second electrode of the second transistor is connected to the second node;
a control electrode of the third transistor is connected to a reset control terminal, a first electrode of the third transistor is connected to the offset voltage terminal, and a second electrode of the third transistor is connected to the first node;
a control electrode of the first transistor is connected to a read control terminal, a first electrode of the first transistor is connected to the second node, and a second electrode of the first transistor is connected to an input channel of the multiplexer; and
an output channel of the multiplexer is connected to the read sub-circuit, and the other output channel of the multiplexer is connected to the sense sub-circuit.

9. A light intensity detection apparatus, comprising the light intensity detection circuit of claim 1.

10. A light intensity detection method, comprising:
providing, by a reset sub-circuit, a reference voltage provided by an offset voltage terminal to a first node;
sensing, by a sense sub-circuit, a voltage of a second node;
providing, by the reset sub-circuit, an offset voltage provided by the offset voltage terminal to the first node, wherein the offset voltage is equal to a difference between a reset voltage and the voltage of the second node sensed by the sense sub-circuit;

generating, by the photoelectric conversion sub-circuit, a corresponding electrical signal according to an incident light signal and outputting the corresponding electrical signal to the first node;

generating, by a source follower sub-circuit, a corresponding voltage signal or current signal according to the electrical signal of the first node and outputting corresponding voltage signal or current signal to the second node; and reading, by a read sub-circuit, the voltage signal or current signal of the second node to determine an incident light intensity.

* * * * *